June 16, 1936.  A. H. SCHMIDTKE  2,044,547
BASKET HANDLE
Filed July 12, 1934
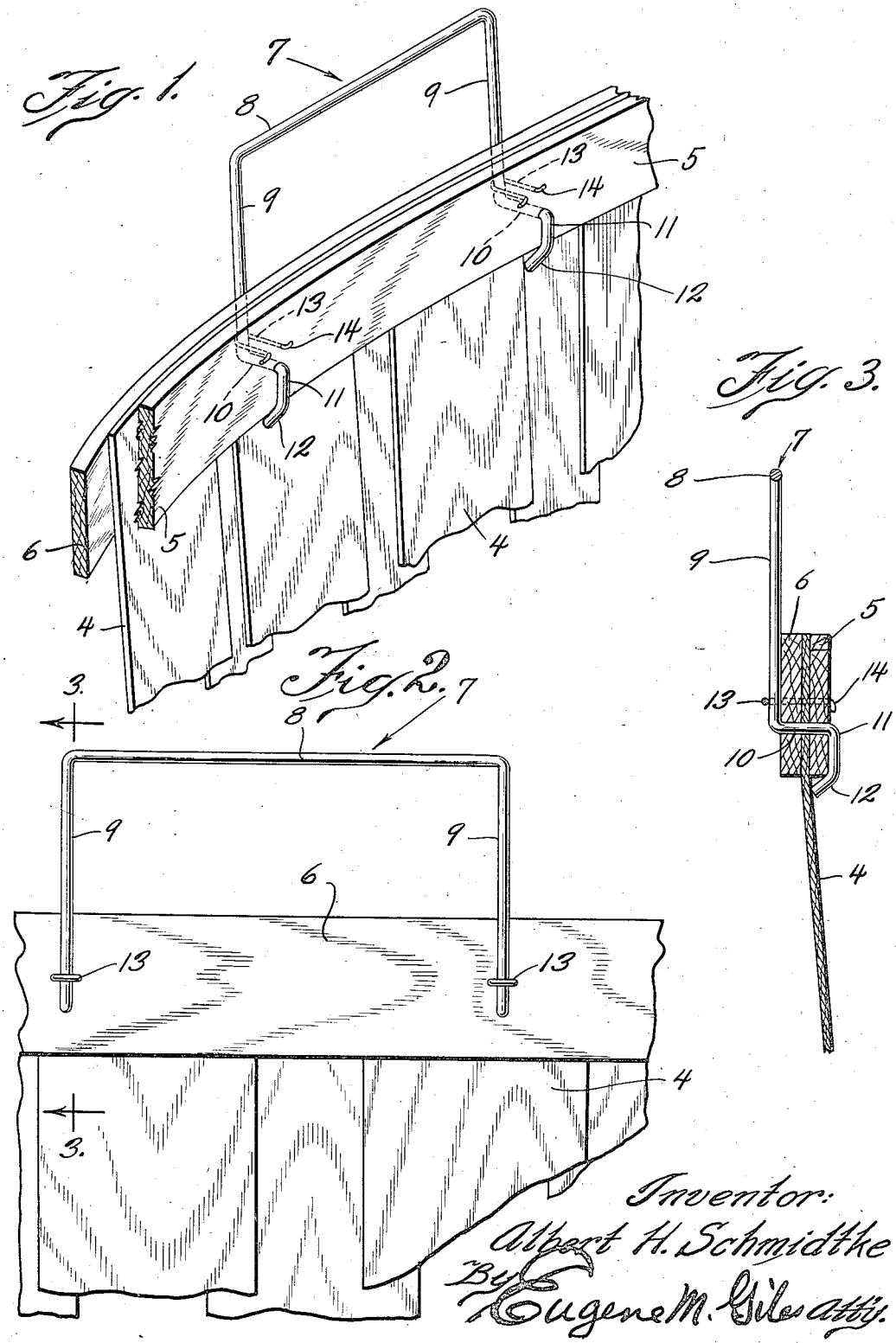

Patented June 16, 1936

2,044,547

UNITED STATES PATENT OFFICE 2,044,547

BASKET HANDLE

Albert H. Schmidtke, St. Joseph, Mich., assignor to St. Joseph Iron Works, St. Joseph, Mich., a corporation of Michigan Application July 12, 1934, Serial No. 734,746

4 Claims. (Cl. 217—125)

My invention relates to an improved handle for baskets and the like and has reference more particularly to the provision of a basket with a wire handle, the ends of which project inwardly through the basket rim and are bent downwardly at the inner side of said rim and outwardly thereunder and the legs of which said handle are secured by fasteners to the outer side of the rim.

It is customary to provide baskets of the type to which this invention relates with handles at opposite sides which, in addition to serving the usual function of handles, are employed as a means for securing a cover onto the basket, the cover being provided with a cross slat, the ends of which project beyond the edges of the cover and are engaged with the basket handles. The baskets are usually filled heaping full to provide what is known as a bulge pack and, after engaging one projecting end of the cover slat with one of the handles, the cover is forced downwardly over the bulged contents of the basket to engage the other projecting end of the slat with the other handle which is sprung outwardly to clear the projecting end of the slat and engage thereover. Not only is excessive strain imposed upon the handles by reason of the bulge pack, but the outward springing of the handles to engage the cover slat is likely to bend the attaching portions of the wire so that parts thereof inside the basket are displaced sufficiently to injure the basket contents and the connection of the handles with the basket may also be loosened so that the handles do not spring back into secure holding engagement with the projecting ends of the cover slat.

The principal objects of my invention are to provide an improved basket handle which is securely attached to the basket in a manner to safely withstand the strains imposed thereon and the rough handling to which shipping baskets are subjected; to anchor the handle to the basket so that the attaching portions thereof are not displaced or disturbed in springing the handle outwardly to engage the projecting end of a cover slat; to provide a rigid connection of the basket and handle whereby the latter will be held securely engaged with the end of the cover slat; to arrange the end portions of the wire inside the basket so that the basket contents are safeguarded against injury therefrom, and to attach the handle to the basket in a reinforced manner, these and other objects being accomplished with the structure shown in the accompanying drawing in which,—

Fig. 1 is a perspective view of a fragmentary top portion of a basket side wall with a handle attached thereto in accordance with my invention, said view showing the inner side of the basket side wall;

Fig. 2 is a view of said top portion of the basket looking at the outer side thereof, and Fig. 3 is a sectional view on the line 3—3 of Fig. 2.

Referring to the drawing which illustrates a preferred form of handle, it is to be understood that the basket to which the handles are attached may be of any desired type, which in accordance with the usual practice, has side wall strips or panels 4, the upper ends of which are secured between inner and outer hoops 5 and 6 respectively to form the basket rim to which the basket handles are attached. The handle which is indicated at 7 is of the same general form as those heretofore used, being made of wire with a middle portion 8 having legs 9 extending downwardly at the outer side of the basket rim and provided at their lower ends with inturned portions 10 which are punched through the hoops 5 and 6 and the intermediate upper ends of the side wall strips or panels 4 and have their extremities clinched against the inner hoop 5.

It has been a common practice to merely turn these extremities upwardly and clinch them in this position against the inner face of the hoop 5, but this has, in many cases, been found to be an unsatisfactory handle attaching expedient as the manipulations to which the handles are subjected in use oftentimes loosen the connection of the handle with the basket rim and bend the wire and displace the clinched inner extremities thereof sufficiently so that they injure the basket contents. This occurs principally in the application and removal of the basket cover as it is the prevailing practice, as previously pointed out, to employ a cover having a slat across the top with projecting ends which are engaged with the basket handles by forcing the handles outwardly to clear the ends of the cover slat and engage thereover for holding the cover in place on the basket. The ends of the cover slat must project far enough beyond the edges of the cover so that they will not accidentally slip out of engagement with the basket handles and it is accordingly necessary in applying the cover, to spring the handles outwardly to such an extent that the attaching portions of the handles are oftentimes twisted loose in the basket rim and bent so that the inner extremities swing inwardly away from the basket rim and puncture or otherwise cause injury to nearby articles in the basket.

It is desirable, therefore, to construct and attach the handles so that the manipulations to which they are subjected will not result in injury to the basket contents, while at the same time it is necessary to minimize material and avoid any appreciable increase in cost in view of the low price at which such baskets must be sold, and it is also important, of course, that the handle and attachment be of such a nature that machines may readily be provided for rapidly and satisfactorily applying the handles to baskets. This is accomplished with my present construction not only by reinforcing the handle attachment so as to prevent twisting and loosening of the wire in the basket rim, but also by arranging the portions of the wire inside the basket so that possibility of injury to the basket contents is avoided. To this end, the inturned portions 10 of the wire are preferably punched through the basket rim near the lower edges of the hoops 5 and 6, as shown, and bent downwardly as at 11 along the inner face of the inner hoop 5 and then outwardly as at 12 under the lower edge of said hoop so that the ends of the wire are disposed in a protected position with the wire portions 10, 11 and 12 constituting a hook like formation which embraces the lower portion of the basket rim and in the event of any twisting or loosening of the handle connection that might occur, this hook like formation merely turns in a sort of pivotal manner on the embraced lower edge portion of the basket rim without displacing any wire parts sufficiently or in a manner to endanger the basket contents and furthermore if any bending of these attaching parts did occur in springing the handles outwardly, this would merely cause the hook ends 12 to swing up closer to the under edge of the hoop 5 when the handle was straightened up. Moreover, to reinforce the handle attachment and to avoid or minimize twisting strains on the attaching portions of the handle, each leg 9 is preferably secured to the basket rim by a staple 13 which straddles the respective leg 9 and is driven through the basket rim and clinched against the inner face of the inner hoop 5 as at 14, these staples being located near to the lower ends of the legs 9 and just above the inturned portions 10 as shown so that there is substantially the same leg length above these staples as there is above the attaching places of ordinary basket handles to permit outward springing of the top portions of the handles for engaging the cover slat ends.

The length of handle wire required for the present construction is practically the same as for the simple form of handle that it has been the prevailing practice to use heretofore, and the staples 13 require very little material and are quite inexpensive so that this handle, although having the additional advantages of safeguarding against injury to the basket contents and greater security of attachment to the hasket rim, may be employed with practically no additional expense and with no material diminishing of the effective length of portions of the handle legs which must remain free in order to permit satisfactory outward springing of the handles for engaging the cover slat ends as above explained.

While I have shown and described my invention in a preferred form, I am aware that various changes and modifications may be made without departing from the principles of my invention, the scope of which is to be determined by the appended claims.

I claim as my invention:

1. The combination of a basket having a rim around the upper edge, a handle having depending legs extending inwardly through the rim, then downwardly at the inner side of the rim, and then outwardly under the lower edge of rim, and a staple embracing each leg near the lower end thereof and engaged through the basket rim.

2. The combination of a basket having a rim around the upper edge, a basket handle having spaced legs extending downwardly at the outer side of the basket rim and provided with inturned lower ends extending through the basket rim, and a staple engaged through the basket rim and straddling each handle leg near to the lower inturned end thereof and substantially midway between the top and bottom edges of the rim.

3. The combination of a basket having a rim around the upper edge, a basket handle having spaced legs extending downwardly at the outer side of the basket rim and provided with inturned lower ends extending through the basket rim, and bent downwardly at the inner side of the basket rim, and a staple engaged through the basket rim and straddling each handle leg near to the lower inturned end thereof and substantially midway between the top and bottom edges of the rim.

4. The combination of a basket having a rim around the upper edge, a basket handle having spaced legs extending downwardly at the outer side of the basket rim and provided with inturned lower ends extending through the basket rim, and with downturned portions at the inner side of the basket rim the lower ends of which said portions are tucked outwardly under the lower edge of the basket rim, and a staple engaged through the basket rim and straddling each handle leg near the lower inturned end thereof.

ALBERT H. SCHMIDTKE.